US006856902B1

(12) United States Patent
Mitchem

(10) Patent No.: US 6,856,902 B1
(45) Date of Patent: Feb. 15, 2005

(54) SYSTEMS AND METHODS FOR PROVIDING ALERTS TO A NAVIGATION DEVICE

(75) Inventor: Matthew Todd Mitchem, Decatur, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 0 days.

(21) Appl. No.: 10/194,691

(22) Filed: Jul. 12, 2002

(51) Int. Cl.$^7$ .......................... G06F 19/00; G06F 7/00; G01C 21/28

(52) U.S. Cl. ...................... 701/213; 701/117; 340/934; 340/995

(58) Field of Search ................. 701/117–119, 200–216; 340/934, 995, 905, 990, 539; 235/384; 123/399; 705/8, 5; 707/10, 200; 455/414, 456, 457, 560

(56) References Cited

U.S. PATENT DOCUMENTS

| | | | |
|---|---|---|---|
| 4,278,844 A | | 7/1981 | Jones |
| 5,060,255 A | | 10/1991 | Brown |
| 5,177,685 A | * | 1/1993 | Davis et al. ................. 455/456 |
| 5,333,180 A | | 7/1994 | Brown et al. |
| 5,438,568 A | | 8/1995 | Weisser, Jr. .................. 370/60 |
| 5,867,498 A | | 2/1999 | Gillman et al. |
| 6,009,409 A | | 12/1999 | Adler et al. |
| 6,181,996 B1 | * | 1/2001 | Chou et al. .................... 701/36 |
| 6,317,058 B1 | * | 11/2001 | Lemelson et al. .......... 340/910 |
| 6,480,783 B1 | * | 11/2002 | Myr ............................ 701/117 |
| 6,556,997 B1 | | 4/2003 | Levy |
| 2001/0029425 A1 | * | 10/2001 | Myr ........................... 701/200 |
| 2002/0027512 A1 | * | 3/2002 | Horita et al. ............... 340/988 |
| 2002/0036584 A1 | * | 3/2002 | Jocoy et al. .................. 342/70 |
| 2002/0101360 A1 | * | 8/2002 | Schrage ...................... 340/901 |

OTHER PUBLICATIONS

U.S. Appl. No. 10/271,283 filed Aug. 12, 2002.
U.S. Appl. No. 10/237,486 filed Sep. 9, 2002.
U.S. Appl. No. 10/236,524 filed Sep. 9, 2002.
U.S. Appl. No. 10/236,489 filed Sep. 6, 2002.
U.S. Appl. No. 10/237,346 filed Sep. 9, 2002.
U.S. Appl. No. 10/447,030 filed May 28, 2003.
"Bell Labs Technology: Customers want more data services," printed from http://www.bell–labs.com/technology/wireless/customerswantdata.html Internet site, accessed on Jun. 19, 2002, 1 page.
"Bell Labs Technology: Too many technological standards," printed from http://www.bell–labs.com/technology/wireless/standards.html Internet site, accessed on Jun. 19, 2002, 1 page.
"Bell Labs Technology: Lucent's support of international standards," printed from http://www.bell–labs.com/technology/wireless/lucent.html Internet site, accessed on Jun. 19, 2002, 1 page.
"Bell Labs Technology: Focusing on wireless transmission—everywhere," printed from http://www.bell–labs.com/technology/wireless/everywhere.html Internet site, accessed on Jun. 19, 2002, 1 page.
"Bell Labs Technology: How is Lucent fueling the Untethered Revolution?" printed from http://www.bell–labs.com/technology/wireless/fueling.html Internet site, accessed on Jun. 19, 2002, 1 page.

(List continued on next page.)

Primary Examiner—Thomas G. Black
Assistant Examiner—Ronnie Mancho
(74) Attorney, Agent, or Firm—Merchant & Gould

(57) ABSTRACT

A navigation device, comprising a processor and one of a visual output device and an audio output device in communication with the processor. The processor calculates a geographic position of the device and provides one of a visual alert via the visual output device and an audio alert via the audio output device when the geographic position of the device approaches a predetermined geographic position.

25 Claims, 4 Drawing Sheets

OTHER PUBLICATIONS

"Bell Labs Technology: Let's make a mobile phone call," printed from http://www.bell–labs.com/technology/wireless/call.html Internet site, accessed on Jun. 19, 2002, 1 page.

"Bell Labs Technology: How does a mobile call reach its destination?" printed from http://www.bell–labs.com/technology/wireless/destination.html Internet site, accessed on Jun. 19, 2002, 2 pages.

"Bell Labs Technology: How do I receive a moble call?" printed from http://www.bell–labs.com/technology/wireless/receive.html Internet site, accessed on Jun. 19, 2002, 1 page.

"Bell Labs Technology: Switching a mobile call at 55 miles per hour," printed from http://www.bell–labs.com/technology/wireless/switching.html Internet site, accessed on Jun. 19, 2002, 2 pages.

"Bell Labs Technology: A "soft" handoff for improved service," printed from http://www.bell–labs.com/technology/wireless/soft.html Internet site, accessed on Jun. 19, 2002, 1 page.

"Bell Labs Technology: What if I've moved out of my service provider's area?" printed from http://www.bell–labs.com/technology/wireless/moved.html Internet site, accessed on Jun. 19, 2002, 1 page.

"Bell Labs Technology: Pinpointing your location," printed from http://www.bell–labs.com/technology/wireless/pinpoint.html Internet site, accessed on Jun. 19, 2002, 1 page.

"Bell Labs Technology: What's hot today? Wireless data!" printed from http://www.bell–labs.com/technology/wireless/hotdata.html Internet site, accessed on Jun. 19, 2002, 1 page.

"Bell Labs Technology: There are some limits on wireless data transmission," printed from http://www.bell–labs.com/technology/wireless/limitsondata.html Internet site, accessed on Jun. 19, 2002, 1 page.

"IEC: Wireless Intelligent Network (WIN)," printed from http://www.iec.org/online/tutorials/win/topic04.html?Next.x=37&Next.y=17 Internet site, accessed on Aug. 6, 2002, 2 pages.

"IEC: Wireless Intelligent Network (WIN)," printed from http://www.iec.org/online/tutorials/win/topic05.html?Next.x=36&Next.y=13 Internet site, accessed on Aug. 6, 2002, 2 pages.

"Bell Labs Technology: Understanding Wireless Mobile Communications," printed from http://www.bell–labs.com/technology/wireless/ Internet site, accessed on Jun. 19, 2002, 2 pages.

"Bell Labs Technology: Mobile wireless means wireless access," printed from http://www.bell–labs.com/technology/wireless/mobileaccss.html Internet site, accessed on Jun. 19, 2002, 2 pages.

"Bell Labs Technology: Early mobile telephone service," printed from http://www.bell–labs.com/technology/wireless/earlyservice.html Internet site, accessed on Jun. 19, 2002, 2 pages.

"Bell Labs Technology: What's the difference between 'cellular' and 'PCS'?" printed from http://www.bell–labs.com/technology/wireless/difference.html Internet site, accessed on Jun. 19, 2002, 1 page.

"Bell Labs Technology: What's is a 'cell'?" printed from http://www.bell–labs.com/technology/wireless/cell.html Internet site, accessed on Jun. 19, 2002, 2 pages.

"Bell Labs Technology: Slicing up the cellular pie," printed from http://www.bell–labs.com/technology/wireless/pie.html Internet site, accessed on Jun. 19, 2002, 1 page.

"Bell Labs Technology: How is a mobile system designed?" printed from http://www.bell–labs.com/technology/wireless/design.html Internet site, accessed on Jun. 19, 2002, 1 page.

"TrafficMode.Com," Printed from http://www.trafficmode.com/page714214.htm Internet site, accessed on Jun. 10, 2002, 3 pages.

"Strategis: Press Resources," printed from http://www.strategisgroup.com/press/findings.asp?ObjectId=48624&HomePage=True Internet site, accessed on Jun. 10, 2002, 8 pages.

"Position Location Solutions," Printed from www.cdmatech.com/solution/pdf/positionlocation.pdf Internet site, accessed on Jun. 10, 2002, 4 pages.

Wang, Jin, et al., "Wireless Voice–over–IP and Implications for Third–Generation Network Design," Bell Labs Technical Journal, Jul.–Sep. 1998, pp. 79–97.

"how 911 works," printed from http://comtact/bellsouth.com/email/bbs/phase2/how911 works.html Internet site, accessed on Jun. 19, 2002, 6 pages.

"IEC Wireless Intelligent Network (WIN)," printed from http://www.iec.org/online/tutorials/win/topic01.html?Back.x=17&Back.y=14 Internet site, accessed on Aug. 6, 2002, 3 pages.

"IEC Wireless Intelligent Network (WIN)," printed from http://www.iec.org/online/tutorials/win/topic02.html?Next.x=38&Next.y=13 Internet site, accessed on Aug. 6, 2002, 3 pages.

"IEC Wireless Intelligent Network (WIN)," printed from http://www.iec.org/online/tutorials/win/topic03.html?Next.x=35&Next.y=14 Internet site, accessed on Aug. 6, 2002, 3 pages.

"SF Bay Traffic.info," printed from http://www.sfbaytraffic.info/aboutus.htm Internet site, accessed on Jun. 10, 2002, 2 pages.

"SF Bay Traffic.info," printed from http://www.sfbaytraffic.info/cgi–bin/welcome.cgi Internet site, accessed on Jun. 10, 2002, 2 pages.

"SF Bay Traffic.info," printed from http://www.sfbaytraffic.info/howitworks.htm Internet site, accessed on Jun. 13, 2002, 2 pages.

"Cingular Wireless Selects TruePosition® as Location Technology Provider for its Nationwide Wireless Network," printed from http://www.trueposition.com/news_cingular.html Internet site, accessed on Nov. 11, 2001, 2 pages.

"Home Toys Article," printed from http://www.hometoys.com/htinews/oct99/articles/panja/panja.htm Internet site, accessed on Jun. 10, 2002, 3 pages.

"SMS Services," printed from http://www.cointel.co/za/smsservicesframe.htm Internet site, accessed on Jun. 10, 2002, 6 page.

"HeyAnita—Engaging your world through voice," printed from http://www.heyanita.com/p_login2.asp Internet site, accessed on Jun. 10, 2002, 1 page.

"HeyAnita—Engaging your world through voice," printed from http://www.heyanita.com/Technology/t_products.asp Internet site, accessed on Jun. 10, 2002, 4 pages.

* cited by examiner

US 6,856,902 B1

SYSTEMS AND METHODS FOR PROVIDING ALERTS TO A NAVIGATION DEVICE

BACKGROUND

The present invention relates generally to navigational devices, and more particularly to systems and methods for providing alerts to navigational devices.

Navigational and position-finding devices have become popular in recent years. Such devices are typically used by aviators, boaters, outdoorsmen, and persons navigating unfamiliar streets in an automobile. The devices typically use global positioning system (GPS) technology to determine the position (e.g. in latitude and longitude) of the device and, in some cases, the altitude of the device.

Many GPS devices have map information stored in a memory device or accept such information from a storage medium such as a CD-ROM. When the latitudinal and longitudinal position of the device is located using GPS techniques, a map marking the position is displayed on a display device. A user of the GPS device can thus navigate using the map based on geographic or cartographic features of the environment in which the user is navigating.

SUMMARY

In one embodiment, the present invention is directed to a navigation device, comprising a processor and one of a visual output device and an audio output device in communication with the processor. The processor calculates a geographic position of the device and provides one of a visual alert via the visual output device and an audio alert via the audio output device when the geographic position of the device approaches a predetermined geographic position.

In one embodiment, the present invention is directed to a system. The system includes a navigation device and a computer in communication with the navigation device. The computer is configured to transfer cartographic information relating to a geographic area that has an alert associated therewith.

In one embodiment, the present invention is directed to a method of providing an alert via a navigation device when the navigation device is approaching a predetermined geographic area. The method includes acquiring data regarding the predetermined geographic area, determining a geographic position of the navigation device, and providing the alert when the geographic position of the navigation device is within a predetermined distance from the predetermined geographic area.

In one embodiment, the present invention is directed to an apparatus. The apparatus includes means for acquiring data regarding a predetermined geographic area, means for determining a geographic position of a navigation device, and means for providing an alert when the geographic position of the navigation device is within a predetermined distance from the predetermined geographic area.

In one embodiment, the present invention is directed to a computer readable medium having stored thereon instructions which, when executed by a processor, cause the processor to acquire data regarding a predetermined geographic area, determine a geographic position of a navigation device, and provide an alert when the geographic position of the navigation device is within a predetermined distance from the predetermined geographic area.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

The present invention, in various embodiments, relates to systems and methods for providing the user of a navigational device, such as a GPS device, a device that uses triangulation techniques, or a device that uses E911 wireless techniques, with an alert when the user is about to enter a geographical area in which an alert may be beneficial. For example, the device may alert the user when the user is approaching an intersection that has a statistically high accident rate or the device may alert the user when the user is approaching a geographical area that has a statistically high crime rate.

Figure 1:
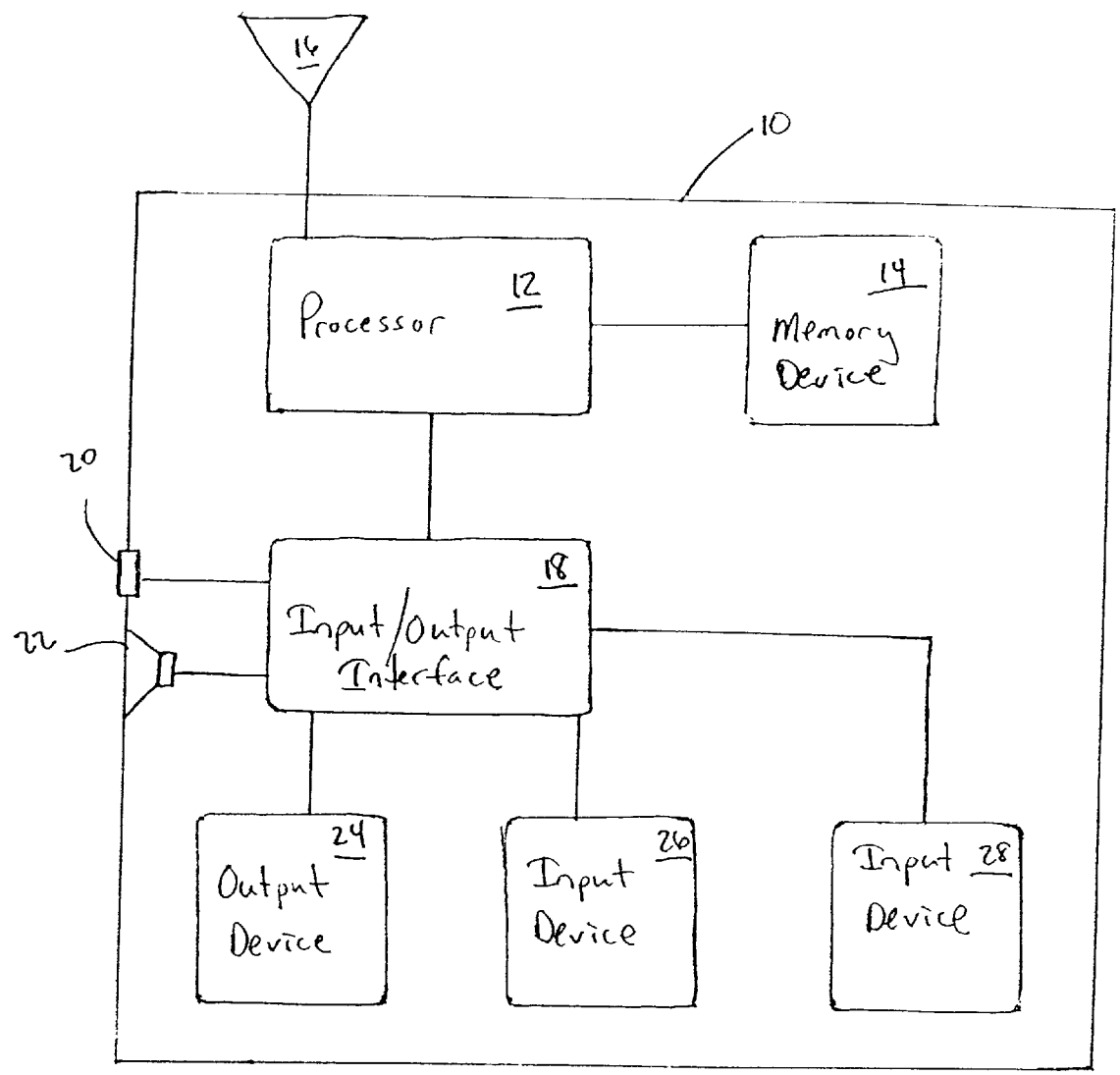
FIG. 1 is a diagram illustrating a navigation device according to one embodiment of the present invention.

FIG. 1 is a diagram illustrating a navigation device 10 according to one embodiment of the present invention. The device 10 includes a processor 12 and a memory device 14. The processor 12 may be, for example, a general purpose or special purpose microprocessor, a digital signal processor, or an application specific integrated circuit (ASIC). The memory 14 may be, for example, a random access memory (RAM), a magnetic or optical storage medium or media, or other suitable memory device or storage medium or media. An antenna 16 is configured to receive signals that are broadcast from orbiting satellites. Although the antenna 16 is illustrated as being exterior to the device 10, it can be understood that the antenna 16 may be located within the device 10.

It can be understood that the device 10 maybe, for example, a GPS device that is portable or a GPS device that is mounted in or integral to the interior or dashboard of a vehicle such as an automobile, airplane, or boat. The device 10 may also be, for example, a device that uses a longitudinal or latitudinal positioning technique, a wireless communications technique such as triangulation, or any other suitable positioning technique such as those used by wireless service providers in connection with the E911 service.

An input/output interface 18 handles input/output processing for the device 10. A jack 20 is in communication with the interface 18 and provides a capability of connecting various devices to the device 10. For example, as described hereinbelow, a computer may be connected to the device 10 via the jack 20. A speaker 22 allows the device 10 to generate audible information such as, for example, audible tones or recorded voice information.

An output device 24 provides output to the user of the device 10. The output device 24 may be, for example, a visual display device such as a liquid crystal display (LCD) device. An input device 26 allows a user to input information or respond to prompts from the device 10. The input device 26 may be, for example, a keypad or a knob that may be used to navigate various menus presented on the output device 24.

A second input device 28 is provided so that the user can input information to be stored in the memory device 14. The input device 28 may be, for example, a CD-ROM drive, a DVD-ROM drive, or a floppy disk drive. The user may cause information, such as cartographic information, to be read by the input device 28 from a magnetic or optical storage medium and stored in the memory device 14. The user may thus initialize the device 10 with cartographic information or may update or enhance cartographic information already stored in the memory 14. Furthermore, the device 10 may rely on the medium that is used with the input device 28 for all cartographic information and may only store parts or fragments, if any and as necessary, of the information in the memory device 14.

Although the various portions of the device 10 are illustrated as being in communication with other portions via single connections, it can be understood that the device 10 may employ a bus architecture and the portions may be in communication with one another via one or more buses.

In operation and according to various embodiments of the present invention, the device 10 may provide an alert to the user of the device 10 when the device 10 is about to approach an area in which the user has instructed the device 10 to provide a warning. For example, if the device 10 is located in an automobile and the user of the device 10 has instructed the device 10 to provide a warning when the automobile is approaching an intersection that has a statistically high accident rate, the device 10 may provide an audible warning via the speaker 22 or a visual warning via the output device 24 to indicate that a dangerous intersection is being approached. For example, the speaker 22 could play a synthesized voice or warning chime or the output device 24 could display an icon. The device 10 may determine its position by communication with global positioning satellites in a conventional manner and may provide additional warnings as the device 10 (and hence the vehicle) approaches the intersection.

In one embodiment, the user of the device 10 may configure the device 10 to provide alert information at a certain distance or certain distances from the geographic area for which the alert applies. For example, in one embodiment a user of the device 10 may instruct the device 10 to generate an alert as the device 10 approaches within ½ mile of a dangerous intersection and then to generate alerts every 500 feet until the intersection is entered. In one embodiment, the user may instruct the device 10 to produce only one alert when the device 10 is a specified distance (e.g. 1500 feet) from a dangerous intersection. The device 10 may also determine when the location of the device 10 has passed the intersection and thus the device 10 will issue no further alerts.

In various embodiments, an alert may suggest that a driver, for example, pay particular attention to their vehicle's speed or the road, be alert for carjackers, or wait for police to arrive before exiting the vehicle after an accident.

Alert information may be added to the cartographic information that the device 10 uses. The alert information may be input via the input devices 26, 28, via a device connected to the jack 20, or via a satellite transmission that is detected by the antenna 16 or the alert information may be pre-stored in the memory device 14. The alert information may be added as a supplement or update to the cartographic information or may be an integral portion of cartographic information that was provided with, for example, cartographic information stored on a storage medium having cartographic information that is compatible or packaged with the device 10.

Alert information may be gathered for particular geographic areas from various public and private sources. For example, in the case of information relating to intersections that are statistically dangerous, such information is published by State Farm Mutual Automobile Insurance Company at at its website, and by various local police departments and governmental agencies. In the case of geographic areas with statistically high crime rates, crime statistics relating to a specific geographic area may be obtained from various public and private sources, such as, for example, from the Pennsylvania Uniform Crime Reporting System.

Figure 2:
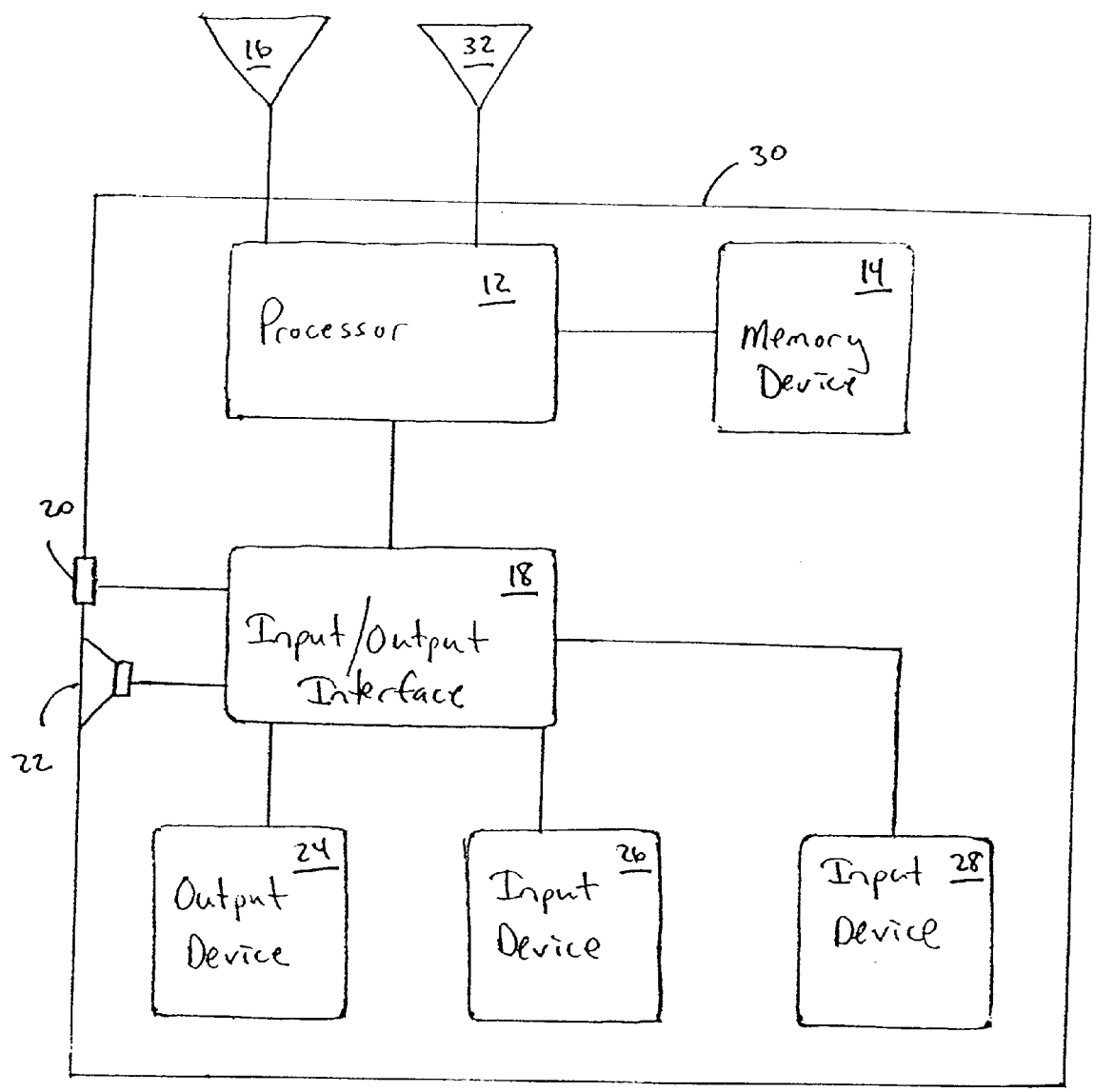
FIG. 2 is a diagram illustrating a navigation device according to one embodiment of the present invention.

FIG. 2 is a diagram illustrating a navigation device 30 according to one embodiment of the present invention. The device 30 is substantially similar to the device 10 of FIG. 1 but further includes a wireless antenna 32. The antenna 32 may receive, for example, wireless or cellular transmissions. Thus, in operation, the device 30 may receive, for example, cartographic information including alert information that is to be conveyed to a user of the device 30. The received cartographic information may be used, for example, to update or enhance cartographic information stored in the memory device 14 or read from a storage medium by the input device 28.

Figure 3:
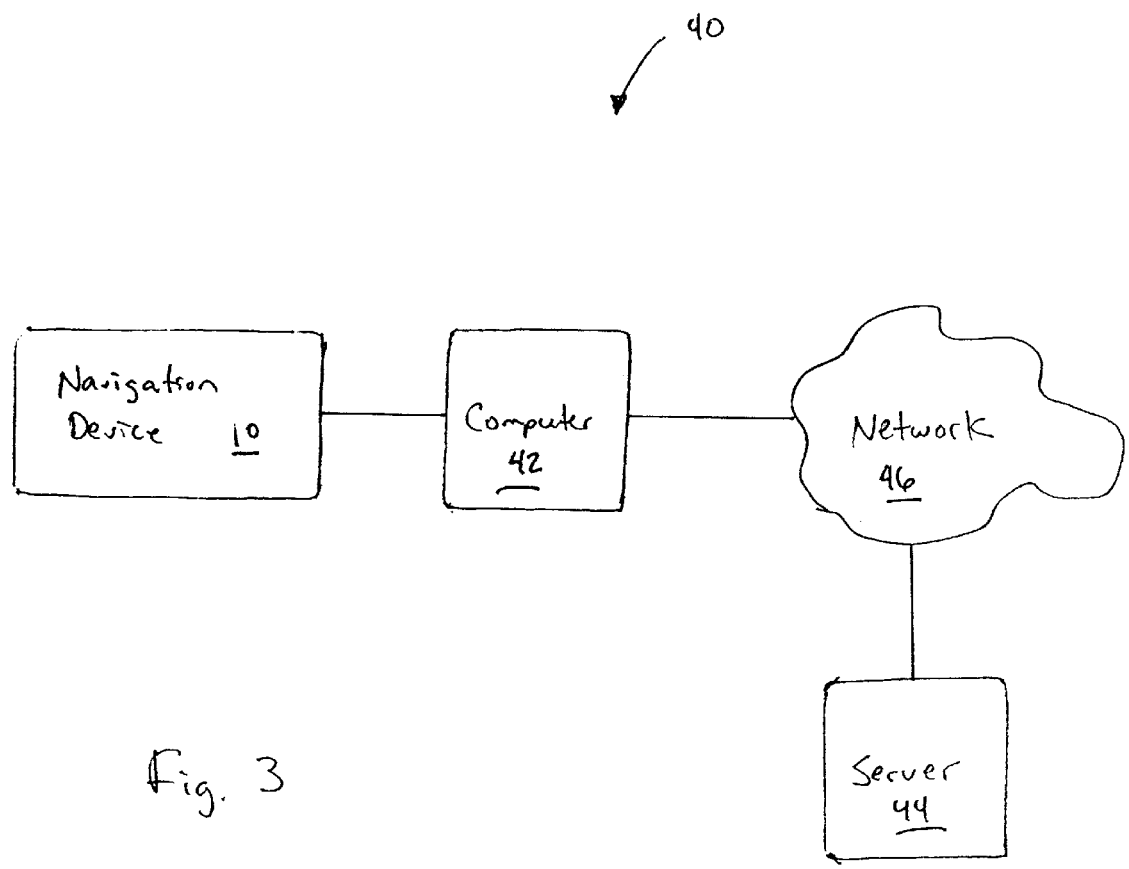
FIG. 3 is a diagram illustrating a system in which the navigation device of FIG. 1 may be incorporated according to one embodiment of the present invention.

FIG. 3 is a diagram illustrating a system 40 in which the navigation device 10 of FIG. 1 (or the navigation device 30 of FIG. 2) may be incorporated according to one embodiment of the present invention. The device 10 is in communication with a computer 42 via, for example, a cable or wire connected between the computer and the jack 20 or, for example, a wireless link. The computer 42 may be, for example, a personal computer, a laptop computer, a personal digital assistant (PDA), or any suitable type of computer. The computer 42 is in communication with a server 44 via a network 46. The network 46 may be, for example, a local area network (LAN), a wide area network (WAN), an intranet, or the Internet. The server 44 may be, for example, a web server.

In one embodiment of the invention, the computer 42 requests and receives cartographic information, such as alert information, from the server 44 via the network 46. The computer 42 then transfers the information to the device 10. In one embodiment of the present invention, the cartographic information is resident on the computer 42 or on a storage medium in communication with the computer 42 and, thus, the computer 42 may transfer the information to the device 10 without requesting information from the server 44. In one embodiment of the present invention, the device 10 has the capability to communicate with the server 44 via the network 46 without the aid of the computer 42. The device 10 may thus obtain cartographic information from the server 44 directly via the network 46.

Figure 4:
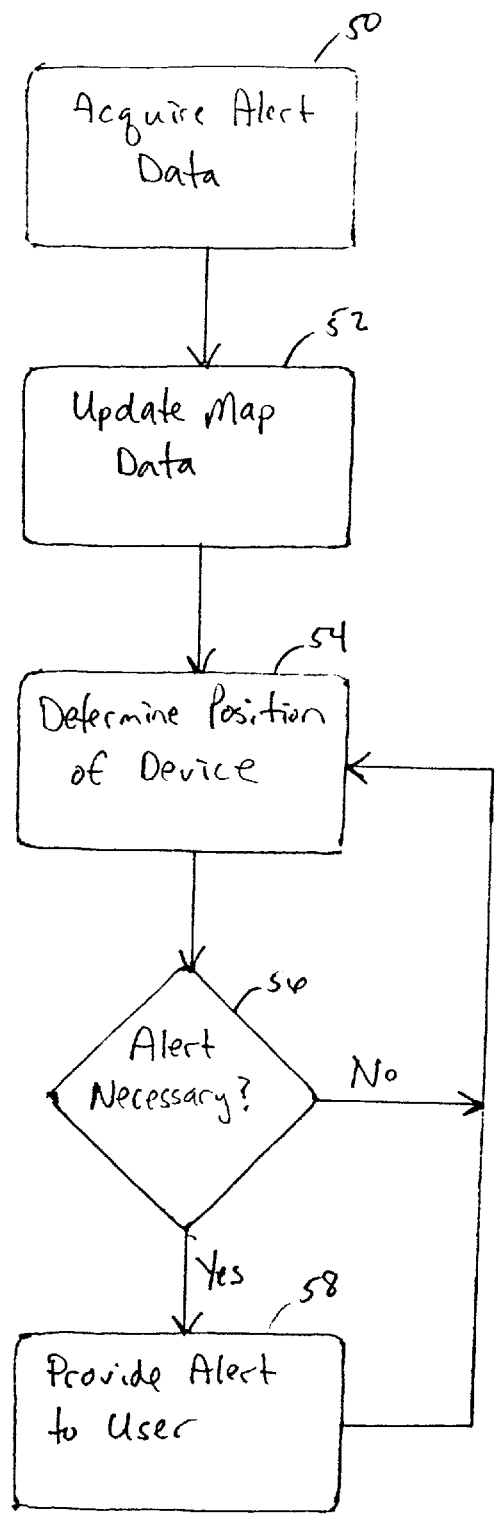
FIG. 4 is a flowchart illustrating a process for providing an alert to a user of the device of FIG. 1 according to one embodiment of the present invention.
Figure 1:
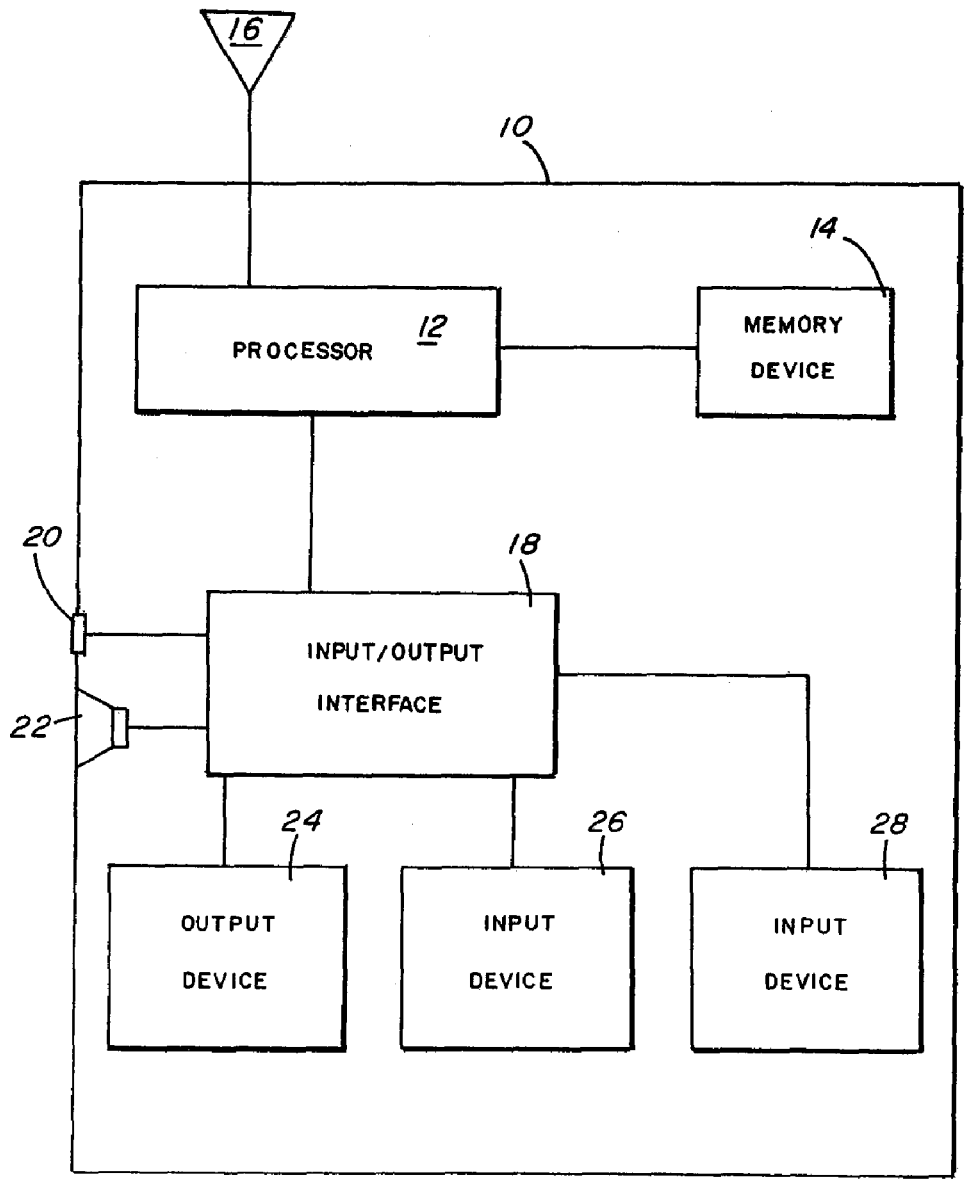
Figure 2:
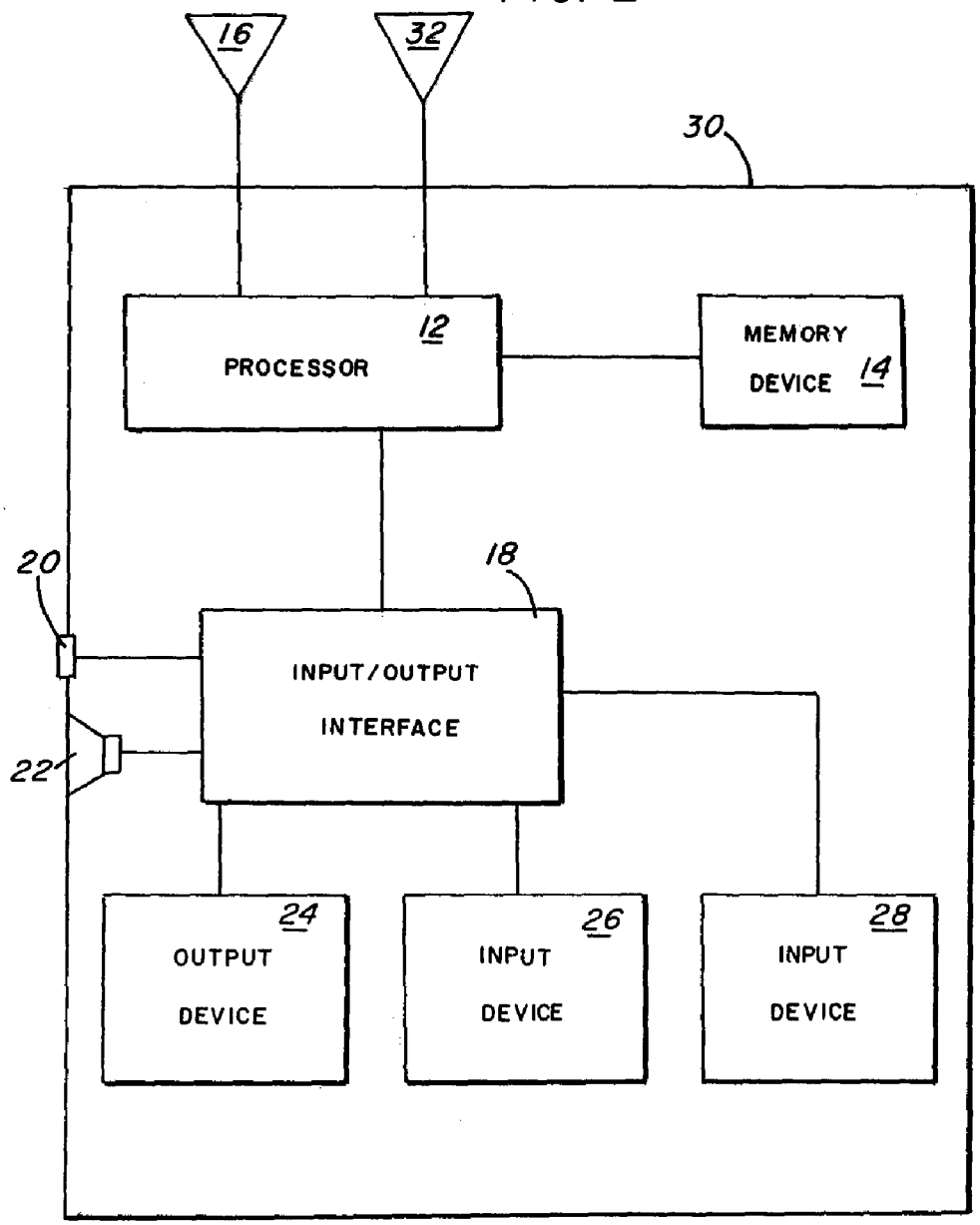
Figure 3:
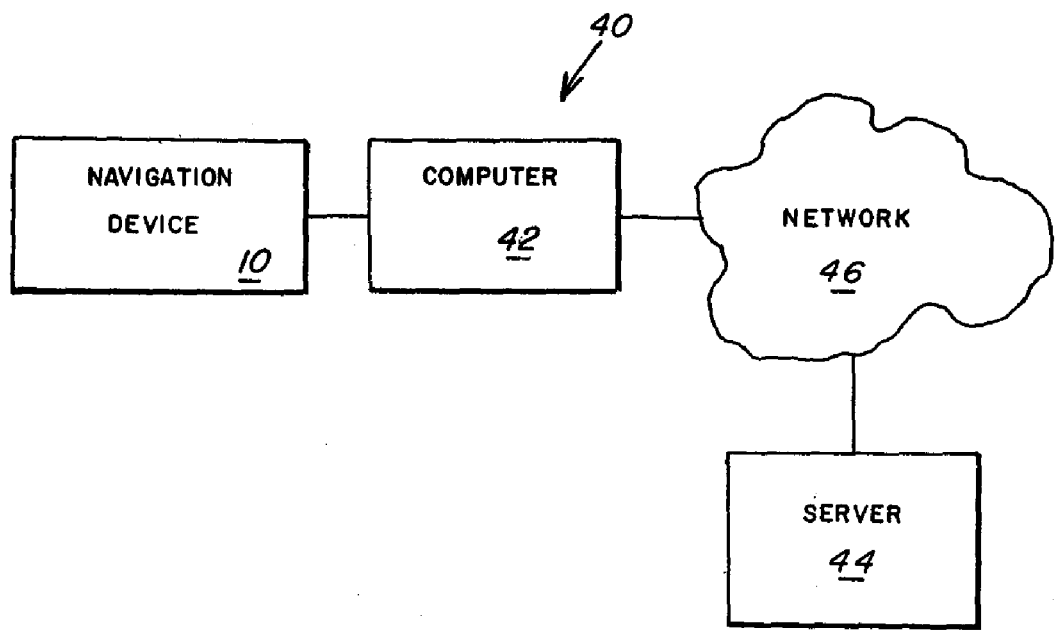
Figure 4:
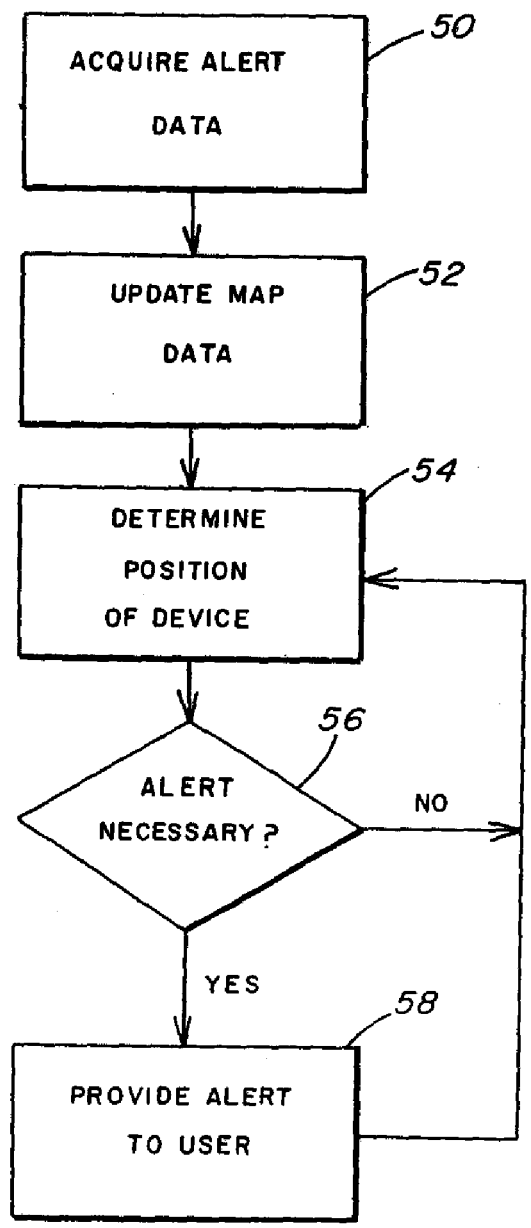

FIG. 4 is a flowchart illustrating a process for providing alerts to a user of the device 10 of FIG. 1 (or the device 30 of FIG. 2) according to one embodiment of the present invention. At step 50, the device 10 acquires the alert data to supplement the cartographic information. At step 52, the cartographic data are updated and at step 54 the device 10 determines the position of the device.

At step 56 the device 10 determines, based on the position of the device 10, whether the device 10 is heading toward a geographical area that requires an alert to be issued. If no alert needs to be issued, the process returns to step 54. If an alert needs to be issued, the device 10 provides, for example, a visual or audible alert at step 58 and then returns to step 54.

In one embodiment of the present invention, the devices and techniques described herein may also be used in connection with the management of a fleet of vehicles. The device 10 may be programmed by, for example, the fleet owner or operator with the coordinates of areas that have statistically high crime rates. The fleet owner or fleet manager may customize alerts based on, for example, the fleet's history of traffic accidents or crime problems.

In one embodiment of the present invention, the methods described herein are embodied in, for example, computer software code that is coded in any suitable programming language such as, for example, C, C++, or microcode. Such computer software code may be embodied in a computer readable medium or media such as, for example, a magnetic storage medium such as a floppy disk or an optical storage medium such as a CD-ROM.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A navigation device, comprising:
   a processor; and
   one of a visual output device and an audio output device in communication with the processor,
   wherein the processor calculates a current geographic position of the device such that when the current geographic position of the device is within a predetermined distance of a predetermined geographic area having predetermined alert information associated therewith, the processor generates one of a visual alert via the visual output device and an audio alert via the audio output device based on the predetermined alert information;
   wherein the predetermined geographic area and predetermined alert information are predetermined based on a historical statistical analysis of traffic accident rates;
   wherein the historical statistical analysis of traffic accident rates is not compiled using the navigation device and is not based on real-time traffic accident conditions; and
   wherein at least one of the visual alert and the audio alert suggests a behavior to be performed by an operator of the navigation device to prevent a real-time traffic accident from occurring.

2. The device of claim 1, wherein the visual output device includes a video display device.

3. The device of claim 1, wherein the audio output device includes a speaker.

4. The device of claim 1, further comprising a memory device in communication with the processor, wherein the memory device has cartographic information stored therein.

5. The device of claim 1, wherein the predetermined geographic area is an intersection with a statistically high accident rate.

6. The device of claim 1, further comprising an antenna for receiving one of satellite transmissions and wireless transmissions.

7. The navigation device of claim 1, wherein the predetermined geographic area is predetermined based on statistics gathered by one of a fleet owner and a fleet manager.

8. The navigation device of claim 1, wherein the suggested behavior to be performed by an operator of the navigation device includes at least one of paying particular attention to a speed of a vehicle associated with the navigation device and paying particular attention to a road on which the vehicle is being driven.

9. The navigation device of claim 1,
   wherein the predetermined geographic area and predetermined alert information are further predetermined based on a historical statistical analysis of crime rates;
   wherein the historical statistical analysis of crime rates is not compiled using the navigation device and is not based on real-time crime conditions; and
   wherein at least one of the visual alert and the audio alert further suggests a behavior to be performed by an operator of the navigation device to prevent a crime from occurring.

10. A system, comprising:
    a navigation device; and
    a computer in communication with the navigation device,
    wherein the computer is configured to transfer cartographic information relating to a predetermined geographic area that has predetermined alert information associated therewith;
    wherein the predetermined geographic area and the predetermined alert information are predetermined based on a historical statistical analysis of traffic accident rates; and
    wherein the historical statistical analysis of traffic accident rates is not compiled using the navigation device and is not based on real-time traffic accident conditions.

11. The system of claim 10, further comprising a server in communication with the computer via a network.

12. The system of claim 11, wherein the network includes the Internet.

13. The system of claim 11, wherein the server includes a web server.

14. The system of claim 10, wherein the navigation device is a GPS navigation device.

15. The system of claim 10, wherein the navigation device comprises:
    a processor; and
    one of a visual output device and an audio output device in communication with the processor,
    wherein the processor calculates a current geographic position of the device such that when the current geographic position of the device is within a predetermined distance of the predetermined geographic area having the predetermined alert information associated therewith, the processor generates one of a visual alert via the visual output device and an audio alert via the audio output device based on the predetermined alert information; and
    wherein at least one of the visual alert and the audio alert suggests a behavior to be performed by an operator of the navigation device to prevent a real-time traffic accident from occurring.

16. The system of claim 10, wherein the predetermined geographic area having the predetermined alert information associated therewith is an intersection with a statistically high accident rate.

17. A method of providing an alert via a navigation device when the navigation device is within a predetermined distance of a predetermined geographic area having predetermined alert information associated therewith, the method comprising:

acquiring data regarding the predetermined geographic area;

determining a current geographic position of the navigation device; and providing the alert based on the predetermined alert information when the current geographic position of the navigation device is within the predetermined distance of the predetermined geographic area, wherein the predetermined geographic area and the predetermined alert information are predetermined based on a historical statistical analysis of traffic accident rates;

wherein the historical statistical analysis of traffic accident rates is not compiled using the navigation device and is not based on real-time traffic accident conditions; and wherein the alert suggests a behavior to be performed by an operator of the navigation device to prevent a real-time traffic accident from occurring.

18. The method of claim 17, wherein providing the alert includes providing one of a visual alert and an audio alert.

19. The method of claim 17, wherein the predetermined geographic area is an intersection with a statistically high accident rate.

20. The method of claim 17, wherein the navigation device is a GPS device.

21. The method of claim 17, further comprising updating cartographic data stored on the navigation device with data regarding the predetermined geographic area.

22. An apparatus, comprising:

means for acquiring data regarding a predetermined geographic area and predetermined alert information associated therewith;

means for determining a current geographic position of a navigation device; and means for providing an alert based on the predetermined alert information when the current geographic position of the navigation device is within a predetermined distance of the predetermined geographic area, wherein the predetermined geographic area and the predetermined alert information are predetermined based on a historical statistical analysis of traffic accident rates;

wherein the historical statistical analysis of traffic accident rates is not compiled by the navigation device and is not based on real-time traffic accident conditions; and wherein the alert suggests a behavior to be performed by an operator of the navigation device to prevent a real-time traffic accident from occurring.

23. A computer readable medium having stored thereon instructions which, when executed by a processor, cause the processor to:

acquire data regarding a predetermined geographic area and predetermined alert information associated therewith;

determine a current geographic position of a navigation device; and provide an alert based on the predetermined alert information when the current geographic position of the navigation device is within a predetermined distance of the predetermined geographic area, wherein the predetermined geographic area and the predetermined alert information are predetermined based on a historical statistical analysis of traffic accident rates;

wherein the historical statistical analysis of traffic accident rates is not compiled by the navigation device and is not based on real-time traffic accident conditions; and wherein the alert suggests a behavior to be performed by an operator of the navigation device to prevent a real-time traffic accident from occurring.

24. A navigation device, comprising:

a processor; and one of a visual output device and an audio output device in communication with the processor, wherein the processor calculates a current geographic position of the device such that when the current geographic position of the device is within a predetermined distance of a predetermined geographic area having predetermined alert information associated therewith, the processor generates one of a visual alert via the visual output device and an audio alert via the audio output device based on the predetermined alert information;

wherein the predetermined geographic area and predetermined alert information are predetermined based on a historical statistical analysis of crime rates;

wherein the historical statistical analysis of crime rates is not compiled using the navigation device and is not based on real-time crime conditions; and wherein at least one of the visual alert and the audio alert suggests a behavior to be performed by an operator of the navigation device to prevent a crime from occurring.

25. The navigation device of claim 24, wherein the suggested behavior to be performed by an operator of the navigation device includes at least one of being alert for a carjacker and waiting for police to arrive before exiting the vehicle following an accident.

* * * * *

UNITED STATES PATENT AND TRADEMARK OFFICE
CERTIFICATE OF CORRECTION

PATENT NO.     : 6,856,902 B1
DATED          : February 15, 2005
INVENTOR(S)    : Mitchem It is certified that error appears in the above-identified patent and that said Letters Patent is hereby corrected as shown below:

Title page,
Item [56], References Cited, OTHER PUBLICATIONS,
replace U.S. Appl. No. "10/271,283" with -- 10/217,283 --; and
replace U.S. Appl. No. "10/236,524 filed Sep. 9, 2002" with
-- 10/236,524 filed Sep. 6, 2002 --.
"how 911 works, " reference, replace "how 911 works," printed from
http://comtact/bellsouth.com/email/bbs/phase2/how911 works.html Internet site,
accessed on Jun. 19, 2002, 6 pages." with
-- "how 911 works," printed from http://contact.bellsouth.com/email/bbs/phase2/
how911works.html Internet site, accessed on Jun. 19, 2002, 6 pages. --
"IEC Wireless Intelligent Network (WIN)," reference, (first occurrence),
replace "IEC Wireless Intelligent Network (WIN)," printed from
http://www.iec.org/online/tutorials/win/topic01.html?Back.x=17&Back.y=14 Internet
site, accessed on Aug. 6, 2002, 3 pages."
with -- "IEC: Wireless Intelligent Network (WIN)," printed from http://www.iec.org/
online/tutorials/win/topic01.html?Back.x=17&Back.y=14 Internet site, accessed on Aug.
6, 2002, 3 pages. --
"IEC Wireless Intelligent Network (WIN)," reference, (second occurrence),
replace "IEC Wireless Intelligent Network (WIN)," printed from
http://www.iec.org/online/tutorials/win/topic02.html?Next.x=38&Next.y=13 Internet
site, accessed on Aug. 6, 2002, 3 pages." with
-- "IEC: Wireless Intelligent Network (WIN)," printed from
http://www.iec.org/online/tutorials/win/topic02.html?Next.x=38&Next.y=13 Internet
site, accessed on Aug. 6, 2002, 3 pages. --
"IEC Wireless Intelligent Network (WIN)," reference, (third occurrence),
replace "IEC Wireless Intelligent Network (WIN)," printed from
http://www.iec.org/online/tutorials/win/topic03.html?Next.x=35&Next.y=14 Internet
site, accessed on Aug. 6, 2002, 3 pages." with
-- "IEC: Wireless Intelligent Network (WIN)," printed from
http://www.iec.org/online/tutorials/win/topic03.html?Next.x=35&Next.y=14 Internet
site, accessed on Aug. 6, 2002, 3 pages. --
"SMS Services," reference, replace "SMS Services," printed from
http://www.cointel.co/za/smsservicesframe.htm Internet site, accessed on Jun. 10, 2002,
6 page." with -- "SMS Services," printed from
http://www.cointel.co.za/smsservicesframe.htm Internet site, accessed on Jun. 10, 2002,
6 page. --

UNITED STATES PATENT AND TRADEMARK OFFICE
CERTIFICATE OF CORRECTION

PATENT NO. : 6,856,902 B1
DATED : February 15, 2005
INVENTOR(S) : Mitchem

It is certified that error appears in the above-identified patent and that said Letters Patent is hereby corrected as shown below:

Drawing sheets, consisting of Fig. 1 – Fig. 4, should be deleted and replaced with the drawing sheets, consisting of Fig. 1 – Fig. 4, as shown on the attached pages.

Signed and Sealed this

Twelfth Day of July, 2005

JON W. DUDAS
*Director of the United States Patent and Trademark Office*